United States Patent [19]

Hashimoto et al.

[11] Patent Number: 5,517,620
[45] Date of Patent: May 14, 1996

[54] DYNAMIC UPDATING OF ROUTING INFORMATION FOR ROUTING PACKETS BETWEEN LAN'S CONNECTED TO A PLURALITY OF ROUTERS VIA A PUBLIC NETWORK

[75] Inventors: Akira Hashimoto, Tokyo; Yuji Ito, Shizuoka, both of Japan

[73] Assignee: NEC Corporation, Japan

[21] Appl. No.: 245,616

[22] Filed: May 19, 1994

[30] Foreign Application Priority Data

May 19, 1993 [JP] Japan ................................. 5-139960

[51] Int. Cl.$^6$ .......................... H04L 12/28; H04L 12/66
[52] U.S. Cl. ................. 395/200.15; 395/200.12; 370/60; 370/94.1
[58] Field of Search ................. 395/200, 200.12, 395/200.15; 370/60, 94.1, 94.3, 85.13

[56] References Cited

U.S. PATENT DOCUMENTS

| | | | |
|---|---|---|---|
| 4,947,390 | 8/1990 | Sheehy | 370/85.13 |
| 4,975,906 | 12/1990 | Takiyasu et al. | 370/85.13 |
| 5,018,133 | 5/1991 | Tsukakoshi et al. | 370/16 |
| 5,060,228 | 10/1991 | Tsutsui et al. | 370/85.13 |
| 5,086,426 | 2/1992 | Tsukakoshi et al. | 370/85.13 |
| 5,088,032 | 2/1992 | Bosack | 395/200 |
| 5,128,926 | 7/1992 | Perman et al. | 370/54 |
| 5,179,558 | 1/1993 | Thacker et al. | 370/94.3 |
| 5,214,646 | 5/1993 | Yacoby | 370/85.14 |
| 5,218,676 | 6/1993 | Ben-Ayed et al. | 395/200 |
| 5,251,205 | 10/1993 | Callon et al. | 370/60 |
| 5,293,488 | 3/1994 | Riley et al. | 395/200 |
| 5,309,437 | 5/1994 | Perlman et al. | 370/85.13 |
| 5,353,283 | 10/1994 | Tsuchiya | 370/60 |
| 5,398,012 | 3/1995 | Derby et al. | 340/825.03 |

OTHER PUBLICATIONS

Krishnan; "Dynamic selection of number of routes for sequential routing"; IEEE 1992, 3 vol. x/viii+1920.

Gene Tsudik; "Datagram Authentication in Internet Gateways: Implications of Fragmentation and Dynamic Routing"; IEEE Journal on Selected Areas in Communications, vol. 7, No. 4, May 1989.

Primary Examiner—Krisna Lim
Attorney, Agent, or Firm—Ostrolenk, Faber, Gerb & Soffen

[57] ABSTRACT

Connected to different routers of a packet routing network through a public network and to local area networks (LAN's) and comprising a routing table keeping routing information for an optimum path between each pair of the LAN's, a local router comprises a protocol processor for periodically processing the routing information into a local routing information protocol (RIP) datum indicative of connection information to the LAN's connected to the local router and a comparator comparing the local RIP datum with stored information of an RIP memory to discard and to write in the memory as a current datum the local RIP datum if the local RIP datum is coincident and incoincident with the stored information, respectively. A public network interface sends the current datum towards the different routers. In the routing table, the routing information is dynamically updated in response to an incoming RIP datum received from any one of the different routers.

26 Claims, 2 Drawing Sheets

DYNAMIC UPDATING OF ROUTING INFORMATION FOR ROUTING PACKETS BETWEEN LAN'S CONNECTED TO A PLURALITY OF ROUTERS VIA A PUBLIC NETWORK

BACKGROUND OF THE INVENTION

This invention relates to packet routing in a packet routing or exchange network in which a plurality of routers, with each router connected to a plurality of local area networks (LAN's), are connected to one another through a public network. More particularly, this invention relates to a packet routing method, to a packet routing network, and to a router for use in the packet routing network. Such a router is often called a remote router in the art.

The local area networks comprise terminal equipments for use by subscribers in transmitting and receiving data as data packets. When intentionally used by the subscribers, the data packets will be called subscriber packets. In order to charge individual subscribers for or in connection with the subscriber packets, charging apparatus is used either in each local area network or in each router. It is herein intended that inclusion of the public network in the packet routing network means use of the charging apparatus between each pair of local area networks used in the packet routing network.

For transmission and reception of the data packets, it has been a preferred practice in each router to resort to dynamic routing by using a routing information protocol (RIP) as a routing protocal indicative of routing or connection information among the local area networks of the packet routing network. In general, each router comprises a routing table. On describing the dynamic routing a little more in detail, attention will be directed to an arbitrary pair of the routers. One of the pair will be called a local router. The other will be referred to as a different router.

Subjecting to protocol processing the, routing information stored in the routing table, the local router periodically (usually, once in thirty seconds) broadcasts to other routers a routing information protocol packet as a routing information protocol datum. Such a routing information protocol datum indicates the connection information to the local area networks connected to the router under consideration. Related to the local router in this manner, the routing information protocol datum is herein called a local routing information protocol datum.

Receiving the local routing information protocol packet as an incoming or received routing information protocol datum, the different router stores the connection information of the incoming routing information protocol datum in its routing table as the routing information and determines an optimum path based on the routing information between a pair of local area networks. One of this pair is connected to the local router. The other is connected to the different router. Consequently, the routing information is in general for use in determining the optimum path, which is similar to the best path as called by Leonard Bosack in U.S. Pat. No. 5,088,032.

In a conventional packet routing network including a public network, only the subscriber packets are delivered to the public network. The routing information protocol packets and like packets should not be delivered to the public network. This is in consideration of use of the charging apparatus and has made it inevitable to use static routing in each router. When the static routing is resorted to, each router preliminarily stores the routing information in its routing table. Based on this preliminarily stored information, the router controls routing of the data packets to the local area networks connected to the router in question.

In such a conventional router, it is impossible for each router to dynamically get the routing information. It has therefore been unavoidable, when current routing information is changed in one of the routers to new routing information, to somehow inform other routers of this change and to manually update the current routing information to the new routing information in their routing tables.

SUMMARY OF THE INVENTION

It is consequently an object of the present invention to provide a method and a network for packet routing among local area networks connected to a plurality of routers which are connected in turn, to one another through a public network and are operable according to dynamic routing.

It is another object of this invention to provide a method and a network which are of the type described and in which it is possible to dynamically deal with a routing table of each router when a change occurs in routing information for the local area networks.

It is a further object of this invention to provide a router which is for use in a packet routing network of the type described.

Other objects of this invention will become clear as the description proceeds.

In accordance with an aspect of this invention, there is provided a packet routing method which is used in each router connected as a local router to other routers with a charging device interposed between each pair of local area networks connected to the local and other routers for charging individual subscribers in connection with a subscriber packet routed between such a pair of local area networks and which comprises the steps of: (A) keeping routing information for an optimum path between each pair of the local area networks connected to the local router and to one of the above-mentioned other routers; (B) holding stored information; (C) periodically protocol processing the routing information into a local routing information protocol datum indicative of connection information to the local area networks connected to the local router; (D) comparing the local routing information protocol datum with the stored information to use the local routing information protocol datum as a current datum of the stored information if the local routing information datum is incoincident with the stored information; (E) transmitting the current datum to the above-mentioned other routers; and (F) updating the routing information in response to connection information indicated by an incoming routing information protocal datum received from the above-mentioned one of other routers.

In accordance with another aspect of this invention, there is provided a packet routing network comprising a plurality of routers wherein each router is connected as a local router to other routers of the routers with a charging device interposed between each pair of local area networks connected to the local and other routers for charging individual subscribers in connection with a subscriber packet routed between such a pair of local area networks and wherein the local router (A) keeps routing information for an optimum path between each pair of the local area networks connected to the local router and to one of the above-mentioned other routers; (B) stored information; (C) periodically protocol processes the routing information into a local routing information protocol datum indicative of connection information to the local area networks connected to the local router; (D) compares the local routing information protocol datum with the stored information to write the local routing information protocol datum in the holding means as a current datum of the stored information if the local routing information protocol datum is incoincident with the stored information; (E) transmits the current datum to the above-mentioned other routers; and (F) updates the routing information in the routing table in response to connection information indicated by an incoming routing information protocol datum received from the above-mentioned one of other routers.

In accordance with still another aspect of this invention, there is provided a router which is connected as a local router in a packet routing network to other routers with a charging device interposed between each pair of local area networks connected to the local and other routers for charging individual subscribers in connection with a subscriber packet routed between such a pair of local area networks and which (A) keeps routing information for an optimum path between each pair of the local area networks connected to the local router and to one of the above-mentioned other routers; (B) holds stored information; (C) periodically protocol processes the routing information into a local routing information protocol datum indicative of connection information to the local area networks connected to the local router; (D) compares the local routing information protocol datum with the stored information to write the local routing information protocol datum in the holding means as a current datum of the stored information if the local routing information protocol datum is incoincident with the stored information (E) transmits the current datum to the above-mentioned other routers; and (F) for updates the routing information in the routing table in response to connection information indicated by an incoming routing information protocol datum received from the above-mentioned one of other routers.

DESCRIPTION OF THE PREFERRED EMBODIMENT

Figure 1:
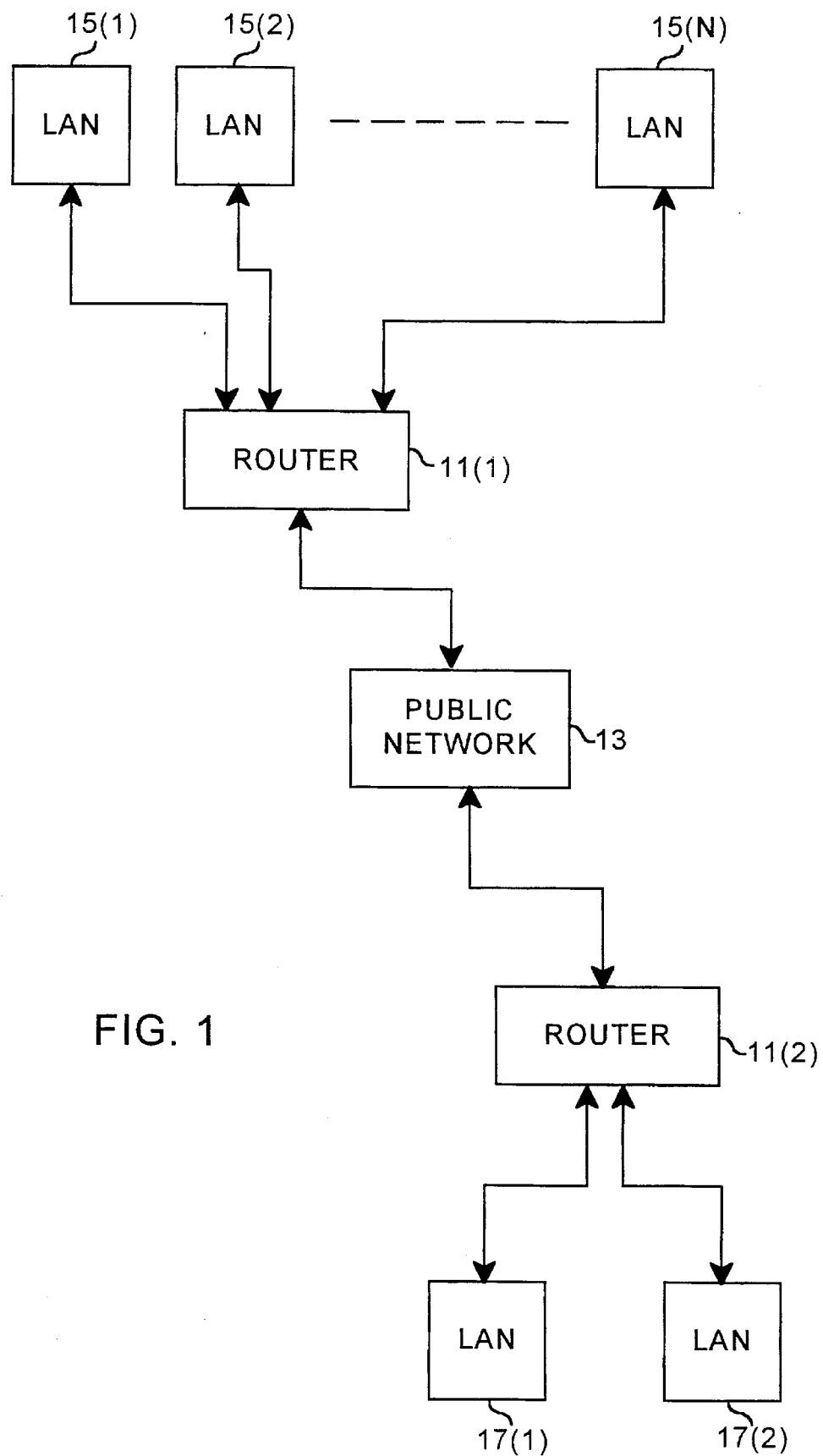
FIG. 1 is a block digram of a packet routing network to which the instant invention is applicable.

Referring to FIG. 1, a packet routing or exchange network will be exemplified. The present invention is applicable to such a packet routing network, to each other through a public network 13. The first and the second routers 11(1) and 11(2) and like routers of the packet routing network will either collectively or individually be designated by a single reference numeral 11. When taken into consideration, an arbitrary one of the routers 11 is herein referred to as a local router 11. Other routers will be denoted also by the reference numeral 11. One of these other routers 11 is called a different router 11.

First, second, . . . , and N-th primary local area networks (LAN's) 15(1), 15(2), . . . , and 15(N) are connected to the first router 11(1), where N represents an integer which depends on the scale of the local area networks under consideration. In the example being illustrated, first and second secondary local area networks 17(1) and 17(2) are connected to the second router 11(2). The primary and the secondary local area networks will either collectively or singly be indicated by reference numerals 15 and 17. Each combination of the primary and the secondary local area networks 15 and 17 may be a Xerox Ethernet system.

Like the routers 11, an arbitrary one of the primary and the secondary local area networks 15 and 17 is herein referred to as each local area network 15. Remaining ones of the primary and the secondary local area networks 15 and 17 are called other local area networks and are designated by the reference numeral 17. When attention is directed to one of these other local area networks 17, this one is herein called a different local area network 17.

Figure 2:
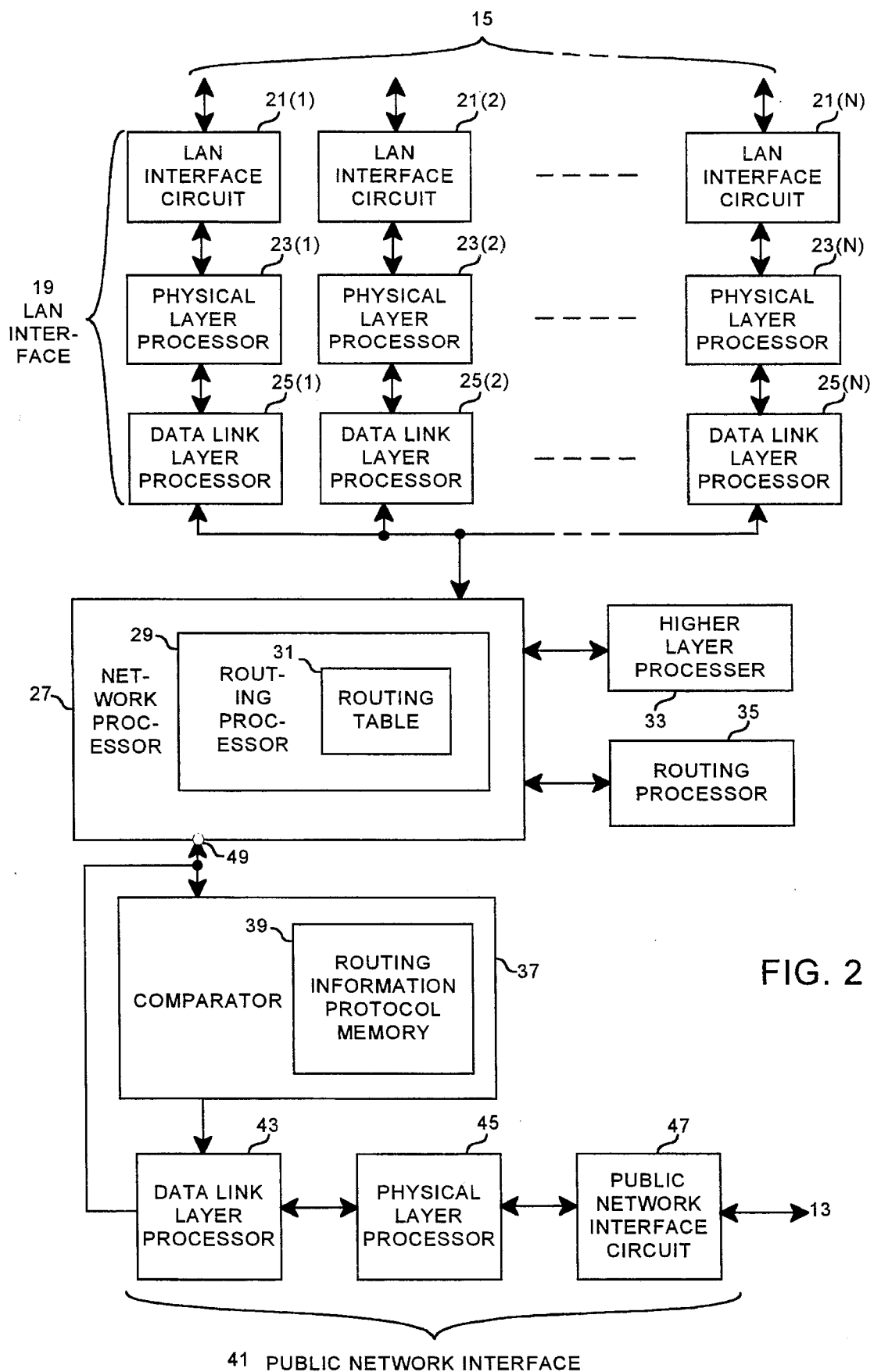
FIG. 2 is a block diagram of a router which is according to an embodiment of this invention and is for use in the packet routing network illustrated in FIG. 1.

Referring to FIG. 2, each router 11 comprises first through N-th local area network interfaces collectively as a local area network interface (LAN INT) 19. First through N-th local area network interface circuits (LN INT CKT) 21(1), 21(2), . . . , and 21(N) are connected to the first through the N-th primary local area networks 15. Collectively designately by a reference numeral 21, the local area network interface circuits 21 are in one-to-one correspondence to the primary local area networks 15. Including routing information protocol (RIP) packets, data packets are transmitted between the primary local area networks 15 and corresponding ones of the local area network interface circuits 21.

It will be surmised that such a router 11 is operable on a network or third layer of the open systems interconnection seven-layer model known in the art. First through N-th physical layer protocol processors (PHYS PROC) 23(1), 23(2), . . . , and 23(N) or 23 are for dealing with protocol processing the packets delivered from and to the local area network interface circuits 21 on a physical or first layer of the seven-layer model. First through N-th data link layer protocol processors (DL PROC) 25(1), 25(2), . . . , and 25(N) or 25 are for protocol processing the packets sent from and to the physical layer protocol processors 23 on a data link or second layer of the seven-layer model.

A network layer protocol processer (NW PROC) 27 protocol processes the packets delivered from and to the first through the N-th data link layer protocol processors 25, namely, the first through the N-th local area network interfaces 19, on the network layer. Included in the network layer protocol processor a routing processor (ROUTING PROC) 29 will become clear as the description proceeds at any rate, the routing processor 29 includes, in turn, a routing table D1 which is loaded with the routing information. In the manner which will presently be described, the routing table 31 is furthermore loaded with other information.

While protocol processing the packets on the network layer, the network layer protocol processor 27 reads the routing table 31 to produce the routing information as read information periodically, typically, once in thirty seconds. In the manner described hereinabove, the routing information indicates an optimum path between each pair of the local area networks 15 and 17. One of this pair is connected to the local router 11 with the other connected to one of other routers t1. The routing information protocol is a routing protocol which is typically the transmission control protocol/internet protocol (TCP/IP) in wide use.

Connected to the network layer protocol processor 27, a higher hierarchy layer protocol processor (HIGH PROC) 33 deals with protocol processing of the packets delivered from and to the network layer protocol processor 27 on higher hierarchy layers above the network layer except for the read information. Connected also to the network layer protocol processor 27, a routing protocol processor (ROUT PROC) 35 data processes the read information sent from the network layer protocol processor 27. That is, the routing protocol processor 35 arranges the read information in accordance with a predetermined format known in the art into a routing information protocol packet, namely, a routing information protocol datum, indicative of the connection information to the primary local area networks 15 connected to the local router 11. Related in this manner to the local router 11, the routing information protocol datum is referred to herein as local routing information protocol datum.

It is now understood that the routing protocol processor 35 periodically protocol processes the routing information into the routing information protocol packet. Such packets are sent back to the network layer protocol processor 27.

A routing information protocol data comparator 37 includes a routing information protocol data memory (RIP MEM) 39 in which no contents are initially stored when each router 11 is first put into operation. Subsequently, the routing information protocol data memory 39 is loaded with the routing information in the manner which will be described in the following. As a result, the routing information protocol data memory 39 is operable as a holding arrangement (39) for holding stored information.

Supplied with the routing information protocol packets successively from the network layer protocol processor 27, the comparator 37 compares the routing information with the stored information. When the local routing information protocol datum is first supplied, the comparator 37 stores the routing information in the holding arrangement 39 afresh as the stored information. Later, the comparator 37 compare, the routing information protocol data successively with the stored information. While the routing information of the local routing information protocol data is coincident with the stored information, the comparator 37 discards the local routing information protocol data.

A public network interface (PUBN INT) 41 is connected between the comparator 37 and the public network 13. In the manner which will shortly become clear, the public network interface 41 delivers the routing information protocol packets and the data packets from the comparator 37 to the public network In addition, the public network interface 41 supplies the network layer protocol processor 27 with the data packets from the public network 13 and with an incoming routing information protocol packet or datum from any one of the remaining routers 11. Although not delivered through the charging apparatus mentioned heretobefore, it is possible to understand that such local and incoming routing information protocol packets are delivered through the public network 13.

When a change somehow occurs in the local routing information protocol datum, the routing information becomes incoincident with the stored information kept in the holding arrangement 39. Detecting this incoincidence, the comparator 37 writes the routing information of the local routing information protocol datum in the holding arrangement 39 as a current datum of the stored information. The comparator 37 furthermore transmits the current datum from the holding arrangement 39 to the remaining routers 11 through the public network interface In the public network interface 41, a single data link layer protocol processor (DL PROC) 43 deals with protocol processing of the packets, namely, the data packets and the routing information protocol packets, delivered from and to the network layer protocol processor 27 on the data link layer. A single physical layer protocol processor (PHYS PROC) 45 protocol processes the packets sent from and to the data link layer protocol processor 43. A single public network interface circuit (PUBN INT CKT) 47 sends or receives the packets between the physical layer protocol processor 45 and the public network 13. Similarly, the current datum is processed by the public network interface 41 for delivery from the holding arrangement 39 to all other routers 11 of the packet routing network.

Reviewing FIGS. 1 and 2, the description will proceed to a summary and an addition to operation of the router 11 and of the packet routing network. It will first be presumed that the current datum, namely, fresh routing information protocol packet or datum, is transmitted from the first router 11(1) to the second router 11(2) and to other routers 11. Before transmission of the current datum, the routing protocol processor 35 periodically produces the routing information protocol packets based on the routing information kept in the routing table 31. Delivered from the network layer protocol processor 27, each routing information protocol packet is supplied to the comparator 37.

While coincident with the stored information of the holding arrangement 39. The routing information protocol packet is ignored by the comparator 37 with the routing information kept unchanged in the routing table 31. If incoincident, the stored information is changed in the holding arrangement 39 into the current datum. The comparator 37 delivers the current datum furthermore to the network layer protocol processor 27. Supplied with the current datum through the network layer protocol processor 27, the routing protocol processor 35 protocol processes the current datum into fresh information. The network layer protocol processor 27 writes the fresh information in the routing table 31 as the routing information together with an indication of the local router 11(1).

In the manner described before, the routing table is updated also when the stored information is afresh stored in the holding arrangement 39. It is possible to understand that a combination of the network layer protocol processor 27, the routing protocol processer 35, and the comparator 37 serves as an updating arrangement and that the updating arrangement is indicated at 49.

It will next be presumed that a routing information protocol datum is afresh received as the incoming routing information protocol datum at the first router 11(1) from the second router 11(2). The incoming routing information protocol datum indicates connection information of the secondary local area networks 17 to the second router 112). Through the public network interface 41, the incoming routing information protocol datum is delivered to the comparator 37 and furthermore to the network layer protocol processor 27 and thence to the routing protocol processor The comparator 37 compares the connection information of the incoming routing information protocol datum with the stored information of the holding arrangement 39. Inasmuch as this connection information is afresh received, the comparator 37 detects incoincidence. A current datum is stored in the holding arrangement 39. This current datum is, however, not delivered to the public network interface 41. Instead, the comparator 37 delivers the incoming routing information protocol datum to the network layer protocol processor 27 as a new routing information protocol datum as it stands.

The routing protocol processor 35 protocol processes the new routing information protocol datum into new information. The network layer protocol processor 27 stores the new information in the routing table 31 as the routing information together with an indication of the second router 11(2). The routing information and, as supplementary information, the indication of the second router 11(2) are stored in the routing table 31 in addition to existing information of the above-mentioned fresh information and the indication of the first router 11(1). Such supplementary information may furthermore indicate which of the local area network interface 19 and the public network interface 41 is used. It is not critical whether the fresh information or the new information is first stored in the routing table 31 together with the supplementary information.

In this manner, the routing information is stored in the routing tables, such as 31, of the routers 11 of the packet routing network. Meanwhile, the data packets may be transmitted from a source local area network to a destination local area network.

It will be assumed that one of the secondary local area networks 17 is the source local area network with one of the primary local area networks 15 selected as the destination local area network. Supplied with the data packets through the public network interface 41 and through the network layer protocol processor 27, the routing processor 29 retrieves the routing table 31 for its contents to determine the optimum path between these ones of the local area networks 17 and 15 and between the second and the first routers 11. Through the optimum path, the first and the second routers 11 deliver the data packets from the source local area network 17 to the destination local area network 15.

It is now appreciated that use of the holding arrangement 39 and the comparator 37 in cooperation with the routing table 31 makes it possible to resort to the dynamic routing even if the packet routing network includes the public network 13. In addition, the routing information protocol packet is delivered to interconnections among the routers 11 only upon occurrence of a change in contents of the routing information protocol datum. This suppresses traffic through the interconnections to a lowest possible level.

While this intention has thus far been described in specific conjunction with a single preferred embodiment thereof, it will now be readily possible for one skilled in the art to put this invention into practice in various other manners. For example, it is possible to use the local area network interface 19 and/or the public network interface 41 separately from each router 11. Furthermore, the router 11 may or may not be operable on the network layer of the seven-layer model. That is, the router 11 may be a bridge, a gateway, or like apparatus.

What is claimed is:

1. A packet routing method used in each router of a plurality of routers in a packet routing network, each router operating as a local router for transmitting packets to and receiving packets from at least a respective one of a plurality of local area networks and operating to dynamically route packets to and from other routers of said packet routing network via public network, comprising the steps of:

storing routing information indicating an optimum switching path between a respective pair of said local area networks in a routing table;

reading said routing information at predetermined intervals;

generating a local routing information protocol datum indicative of said optimum switching path from said routing information;

storing a previously stored routing datum;

reading said previously stored routing datum; comparing said local routing information protocol datum with said previously stored routing datum;

storing said local routing information protocal datum as a currently stored routing datum in place of said previously stored routing datum when said local routing information protocol datum is not coincident with said previously stored routing datum;

transmitting said currently stored routing datum, when said currently stored routing datum is present, to said other routers via said public network; and updating said routing information stored in said routing in response to an incoming routing information protocol datum received from one of said other routers via said public network to dynamically maintain current routing information in said routing table.

2. A packet routing method as claimed in claim 1, wherein said comparing step ignores said local routing information protocol datum if said local routing information protocol datum is coincident with said previously stored routing datum.

3. A packet routing method as claimed in claim 1, further comprising the steps of converting said currently stored routing datum into updated routing information, and storing said updated routing information together with an indication of said local router.

4. A packet routing method as claimed in claim 3, further comprising the steps of reading, at predetermined intervals, said updated routing information and said indication of said local router, and generating said local routing information protocol datum as a function of said updated routing information and said indication of local router.

5. A packet routing network comprising a plurality of routers, each of said routers operating as a local router for transmitting packets to and receiving packets from at least a respective one of a plurality of local area networks and operating to dynamically route packets to and from others of said routers via a public network; each of said routers comprising:

a routing table for storing routing information indicating an optimum switching path between a respective pair of said local area networks;

processing means for reading said routing information from said routing table and for generating a local routing information protocol datum indicative of said optimum switching path from said routing information;

holding means for storing a previously stored routing datum;

comparing means for reading said previously stored routing datum from said holding means and for comparing said local routing information protocol datum with said previously stored routing datum, said local routing information protocol datum being stored in said holding means as a currently stored routing datum in place of said previously stored routing datum when said local routing information protocol datum is not coincident with said previously stored routing datum;

transmitting means for transmitting said currently stored routing datum, when said currently stored routing datum is present, to said others of said routers via said public network; and updating means for updating said routing information stored in said routing table in response to an incoming routing information protocol datum received from one of said others of said routers via said public network to dynamically maintain current routing information in said routing table.

6. A packet routing network as claimed in claim 5, wherein each of said routers further comprises local area network interface means for transmitting said packets to said at least one local area network and for receiving said packets from said at least one local area network.

7. A packet routing network as claimed in claim 5, wherein said comparing means ignores said local routing information protocol datum if said local routing information protocol datum is coincident with said previously stored routing datum.

8. A packet routing network as claimed in claim 6, wherein said comparing means delivers said currently stored routing datum to said processing means, and said processing means converts said currently stored routing datum into updated routing information and stores said updated routing information in said routing table together with an indication of said local router.

9. A packet routing network as claimed in claim 8, wherein said processing means reads, at predetermined intervals, said updated routing information and said indication of local router and generates said local routing information protocol datum as a function of said updated routing information and said indication of local router.

10. A packet routing network as claimed in claim 5, wherein each of said routers further comprises public network interface means for transmitting said packets and said currently stored routing datum to said public network and for receiving said packets and said incoming information protocol datum from said public network.

11. A router operating as a local router in a packet network for transmitting packets to and receiving packets from at least a respective one of the plurality of local area networks and operating to dynamically route packets to and from other routers in said packets network via a public network; said router comprising:

a routing table for storing routing information indicating an optimum switching path between a respective pair of said local area networks;

processing means for reading said routing information from said routing table and for generating a local routing information protocol datum indicative of said optimum switching path from said routing information;

holding means for storing a previously stored routing datum;

comparing means for reading said previously stored routing datum from said holding means and for comparing said local routing information protocal datum with said previously stored routing datum, said local routing information protocol datum being stored in said holding means as a currently stored routing datum in place of said previously stored routing datum is not coincident with said previously stored routing datum;

transmitting means for transmitting said currently stored routing datum, when said currently stored routing datum is present, to said other routers via said public network; and updating means for updating said routing information stored in said routing table in response to an incoming routing information protocol datum received from one of said other routers via said public network to dynamically maintain current routing information in said routing table.

12. A router as claimed in claim 11, wherein said comparing mean ignores said local routing information protocol datum if said local routing information protocol datum is coincident with said previously stored routing datum.

13. A router as claimed in claim 11, wherein said comprising means delivers said currently stored routing datum to said processing means, and said processing means converts said currently stored routing datum into updated routing information and stores said updated routing information in said routing table together with an indication of said local router.

14. A router as claimed in claim 13, wherein said processing means reads, at predetermined intervals, said updated routing information and said indication of local router and generates said local routing information protocol datum as a function of said updated routing information and said indication of local router.

15. A router as claimed in claim 11, further comprising local area network interface means for transmitting said packets to said at least one local area network and for receiving said packets from said at least one local area network.

16. A router as claimed in claim 11, further comprising public network interface means for transmitting said packets and said currently stored routing datum to said public network and for receiving said packets and said incoming information protocol datum from said public network.

17. A packet routing network comprising a plurality of routers, each of said routers operating as a local router for transmitting packets to and receiving packets from at least a respective one of a plurality of local area networks and operating to dynamically route packets to and from others of said routers via said public network, each of said routers comprising:

a routing table indicating an optimum switching path between a respective pair of said local area networks;

processing means for reading said routing information from said routing table and for generating a local routing information protocol datum indicative of said optimum switching path from said routing information;

a holding memory for storing a previously stored routing datum;

a comparator for reading said previously stored routing datum from said holding memory and for comparing said local routing information protocol datum with said previously stored routing datum, said local routing information protocol datum being stored in said holding memory as a currently stored routing datum in place of said previously stored routing datum when said local routing information protocol datum is not coincident with said previously stored routing datum, said comparator transmitting said currently stored routing datum, when said currently stored routing datum is present, to said others of said routers via said public network; and updating means for updating said routing information stored in said routing table in response to an incoming routing information protocol datum received from one of said other routers via said public network to dynamically maintain current routing information in said routing table.

18. A packet routing network as claimed in claim 17, wherein said comparator delivers said currently stored routing datum to said processing means, and said processing means converts said currently stored routing datum into updated routing information and stores said updated routing information in said routing table.

19. A packet routing network as claimed in claim 18, wherein said processing means reads, at predetermined intervals, said updated routing information and said indication of local router and generates said local routing information protocol datum as a function of said updated routing information and said indication of local router.

20. A packet routing network as claimed in claim 17, wherein each of said routers includes a local area network interface for transmitting said packets to said at least one local area network and for receiving said packets from said at least one local area network.

21. A packet routing network as claimed in claim 17, wherein each of said routers includes a public network interface for transmitting said packets and said currently stored routing datum to said public network and for receiving said packets and said incoming information protocol datum from said public network.

22. A router operating as a local router in a packet network for transmitting packets to and receiving packets from at least a respective one of a plurality of local area networks and operating to dynamically route packets to and from other routers in said packet network via a public network, said router comprising:

a routing table for storing routing information indicating an optimum switching path between a respective pair of said local area networks;

processing means for reading said routing information from said routing table and for generating a local routing information protocol datum indicative of said optimum switching path from said routing information;

a holding memory for storing a previously stored routing datum;

a comparator for reading said previously stored routing datum from said holding memory and for comparing said local routing information protocol datum with said previously stored routing datum, said local routing information protocol datum being stored in said holding memory as a currently stored routing datum in place of said previously stored routing datum when said local routing information protocol datum is not coincident with said previously stored routing datum, said comparator transmitting said currently stored routing datum, when said currently stored routing datum is present, to said others of said routers via said public network; and updating means for updating said routing information stored in said routing table in response to an incoming routing information protocol datum received from said other routers via said public network to dynamically maintain current routing information in said routing table.

23. A router as claimed in claim 22, wherein said comparator delivers said currently stored routing datum to said processing means, and said processing means converts said currently stored routing datum into updated routing information and stores said updated routing information in said routing table together with an indication of said local router.

24. A router as claimed in claim 23, wherein said processing means reads, at predetermined intervals, said updated routing information and said indication of local router and generates said local routing information protocol datum as a function of said updated routing information and said indication of local router.

25. A router as claimed in claim 22, further comprising a local area network interface for transmitting said packets to said at least one local area network and for receiving said packets from said at least one local area network.

26. A router as claimed in claim 22, further comprising a public network interface for transmitting said packets and said currently stored routing datum to said public network and for receiving said packets and said incoming information protocol datum from said public network.

* * * * *